United States Patent
Hamilton, II et al.

(10) Patent No.: US 6,389,539 B1
(45) Date of Patent: May 14, 2002

(54) METHOD AND SYSTEM FOR ENHANCING SECURITY ACCESS TO A DATA PROCESSING SYSTEM

(75) Inventors: Rick Allen Hamilton, II; Chetan Mehta, both of Austin; Maulin Ishwarbhai Patel; Edward Woodrow Wild, Jr., both of Round Rock, all of TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/163,514

(22) Filed: Sep. 30, 1998

(51) Int. Cl.$^7$ .......................... G06F 12/14; G06F 9/445
(52) U.S. Cl. ....................... 713/200; 714/758; 713/2
(58) Field of Search ............................ 713/200, 201, 713/1, 2, 161, 163, 164, 165, 176, 194, 202; 711/163, 164; 714/758, 46, 37, 38, 39, 49, 51, 52; 709/223, 224, 225

(56) References Cited

U.S. PATENT DOCUMENTS 5,905,661 A * 5/1999 Lovell ........................ 713/202
5,918,008 A * 6/1999 Togawa et al. ............. 713/200

* cited by examiner

*Primary Examiner*—Gilberto Barron, Jr.
*Assistant Examiner*—Christopher A. Revak
(74) *Attorney, Agent, or Firm*—Leslie A. Van Leeuwen; Bracewell & Patterson, L.L.P.

(57) ABSTRACT

A method and system for checking security when a request for system access is received by a computer system within a network environment is disclosed. When a request for system access into a network environment is first received, a service processor checks a fixed non-null pattern and based on its results performs a Cyclic Redundancy Check (CRC) on the contents of CMOS memory to verify its authenticity. An IEEE-standard CRC algorithm is used to confirm that the data in the CMOS memory has not been corrupted. If the fixed non-null pattern and/or CRC algorithm confirms that no corruption exists, then the service processor prompts the user for a system password and performs the normal authentication checks between the entered password and a stored password. If the CRC algorithm detects that corruption exists, then the service processor determines where the request was received. In response to a determination that the request was received remotely, then access is denied as a security threat. If the service processor determines that the request was received locally, then access to the network environment is granted to the user.

23 Claims, 3 Drawing Sheets

METHOD AND SYSTEM FOR ENHANCING SECURITY ACCESS TO A DATA PROCESSING SYSTEM

BACKGROUND OF THE INVENTION

1. Technical Field

The present invention relates to a method and system for data processing or information handling systems in general and, in particular, to a method and system for providing security accesses in a computer system. Still more particularly, the present invention relates to a method and system for denying remotely made security access requests in the event of CMOS memory corruption in a computer system within a network environment.

2. Description of the Prior Art

A computer usually contains valuable, confidential or otherwise restricted information in its memory and/or external storage devices, so it is accordingly desirable to control access to this information to prevent unauthorized use. Such controlled access to computer data may be realized either by providing physical (hardware) means for preventing the use of the computer itself or I/O devices on a computer system, or by providing software means for restricting access, such as a routine that confirms a user's knowledge of a password before granting that user access to information contained in the computer system.

A password function is commonly included in the power-on or boot-up routines executed by the CPU when the power switch is turned on. This is to prevent an unauthorized user from being able to defeat the password by rebooting, as well as to prevent access to unattended systems. To this end, a password is stored in a location which is non-volatile, i.e., survives when power is off, and is also not accessible to an unauthorized user when power is on so the password cannot be copied then used later. Preferably, the code for this power on password function is stored in ROM, rather than on the hard disk, so unauthorized access cannot be achieved by forcing a boot from a floppy disk, or by reading the code from the hard disk while the system is operating.

For the above-stated reasons, the power-on password functions have been implemented, as on the IBM server business computers, using non-volatile RAM to store the password, and boot-up ROM space to store the code to perform the password routine. A particular device commonly used for this non-volatile RAM is a CMOS RAM with a built-in lithium battery, constructed as part of a clock/calendar chip. This device uses a crystal oscillator and counter circuitry to maintain real time so the operating system of the computer can read registers in the CMOS RAM upon boot-up to enter the time and date. The CMOS RAM part of the chip has extra registers, not needed for the clock/calendar function, used for holding system configuration data which is also accessed at boot-up so the operating system can define the particular system as it exists. In these additional registers, prior systems have also stored the password data for a power-on password function. When the computer is turned on, machine-language code in the startup ROM part of memory is executed, requiring the user to input the password, and the user's input is compared to the password stored in the CMOS RAM. If the passwords match, the remaining startup code is executed, and the system becomes operational. If the passwords do not match, however, startup execution is halted and the system is left inoperable, thus preventing unauthorized use of the system.

However, a problem, that may arise, is that of CMOS RAM corruption. If power has been removed from the CMOS RAM chip at any time since the previous boot, there is a strong possibility that some or all of its contents may have been lost. To exacerbate this problem, many contingencies exist which may result in the loss of power, such as the removal or replacement of the backup battery, or the replacement of various components requiring temporary removal of cables or power-supplying units. Consequently, it would be desirable to provide an improved method and system for detecting and handling the CMOS-stored system password in such cases where the CMOS may have been corrupted within a network environment.

SUMMARY OF THE INVENTION

In view of the foregoing, it is therefore an object of the present invention to provide an improved method and system for providing data security in a computer system or information handling system.

It is another object of the present invention to provide an improved method and system for detecting and handling CMOS-stored system passwords in cases where the CMOS has been corrupted within a network environment.

It is yet another object of the present invention to provide an improved method and system for handling remote log-ins when CMOS-stored system passwords have been corrupted within a network environment.

In accordance with a preferred embodiment of the present invention, when a request for system access into a network environment is first received, a service processor checks a fixed non-null pattern and based on its results performs a Cyclic Redundancy Check (CRC) on the contents of CMOS memory to verify its authenticity. An IEEE-standard CRC algorithm is used to confirm that the data in the CMOS memory has not been corrupted. If the fixed non-null pattern and/or CRC algorithm confirms that no corruption exists, then the service processor prompts the user for a system password and performs the normal authentication checks between the entered password and a stored password. If the CRC algorithm detects that corruption exists, then the service processor determines where the request was received. In response to a determination that the request was received remotely, then access is denied as a security threat. If the service processor determines that the request was received locally, then access to the network environment is granted to the user.

All objects, features, and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION OF A PREFERRED EMBODIMENT

The present invention may be executed in a variety of computer systems under a number of different operating systems or information handling systems. In addition, the computer system may be a stand-alone system or part of a network such as a local-area network (LAN) or a wide-area network (WAN). For the purpose of illustration, a preferred embodiment of the present invention, as described below, is implemented on server business computers, such as the RS/6000 model S70, manufactured by International Business Machines Corporation.

Figure 1:
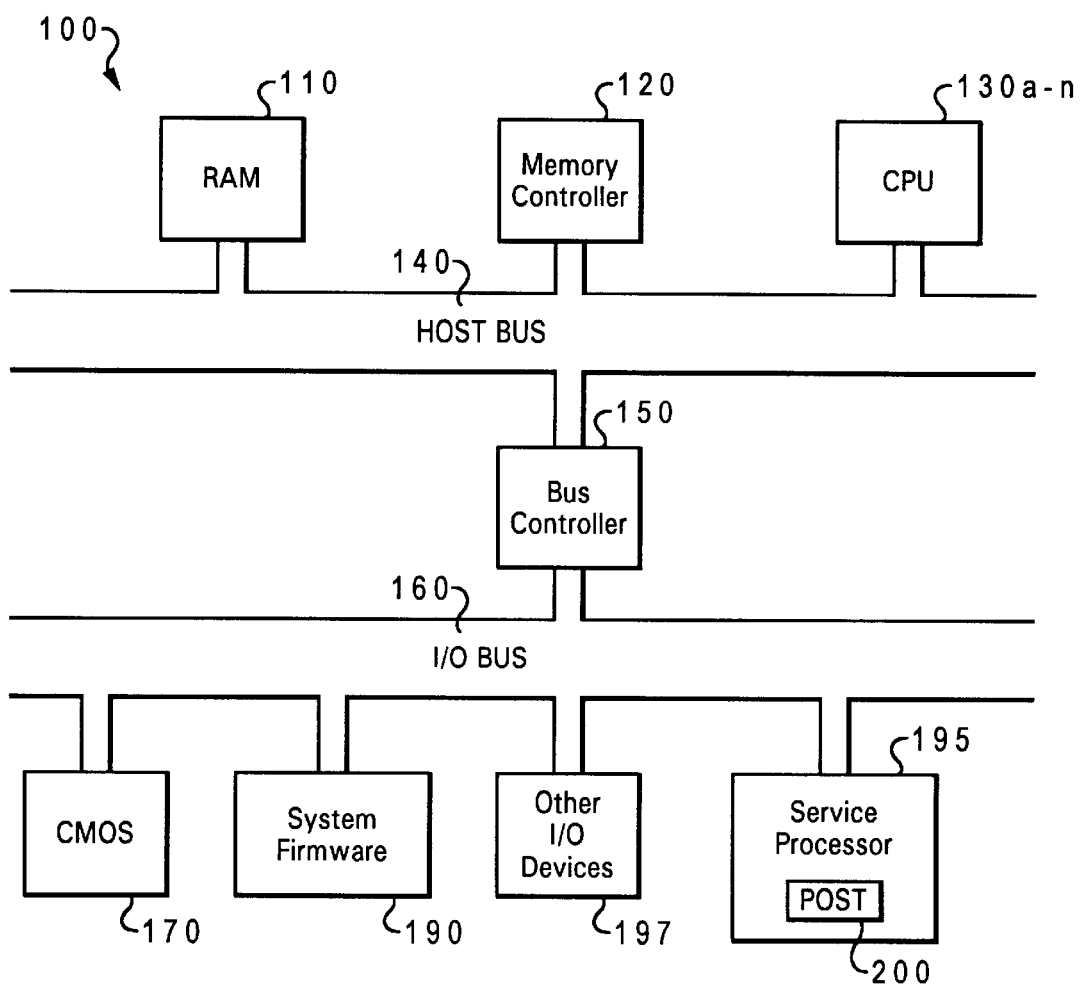
FIG. 1 is a system block diagram of a symmetrical multi-processing system, which may be utilized in conjunction with a preferred embodiment of the present invention.

Referring now to the drawings and in particular to FIG. 1, there is depicted a system block diagram of a typical symmetrical multi-processing system 100 which may be utilized in conjunction with a preferred embodiment of the present invention. As shown, multiple central processing units (CPUs) 130a to 130n are connected to system RAM 110 via a memory controller 120 and host bus 140. The multiple central processing units (CPUs) 130a to 130n are further connected to other hardware devices via host bus 140, bus controller 150, and I/O bus 160. These other hardware devices include, for example, system firmware Read-Only Memory (ROM) 190, service processor 195 in which a Power On Self Test (POST) program 200 is stored, a nonvolatile storage device, such as CMOS 170, as well as other I/O devices, including for example, a keyboard, display, mouse, joystick, or the like, all of which are collectively designated by reference numeral 197.

The machine-executed method of the present invention is invoked at the user's request and is performed by executable computer software contained in the service processor 195. The service processor is a built in microcontroller in a symmetrical multi-processing or server system. An actual implementation of such a service processor might be used on IBM server based microprocessors, or on other suitable processor-based computer systems. Besides assisting the server system during Initial Program Load (by testing the system hardware) its primary responsibility is to monitor the health of the server system. If the server system fails (due to hardware or software fault) the service processor 195 is able to detect the condition and take actions like attempt reboot/ recovery or Call Home to report the problem. It should be understood that the service processor 195 on IBM based servers does not run the native operating system (AIX, NT, etc) but instead uses its own operating environment. Additionally, the service processor 195 typically operates on Standby Power and is therefore "alive" even when the system is powered off. This allows the service processor 195 to support remote operation especially useful to perform remote diagnostics.

(It will be appreciated by those of ordinary skill of course, that references to the performance of method steps by computer software actually mean that a computer, or one of its components, is performing the method steps in response to the instructions encoded in the computer software.)

Figure 2:
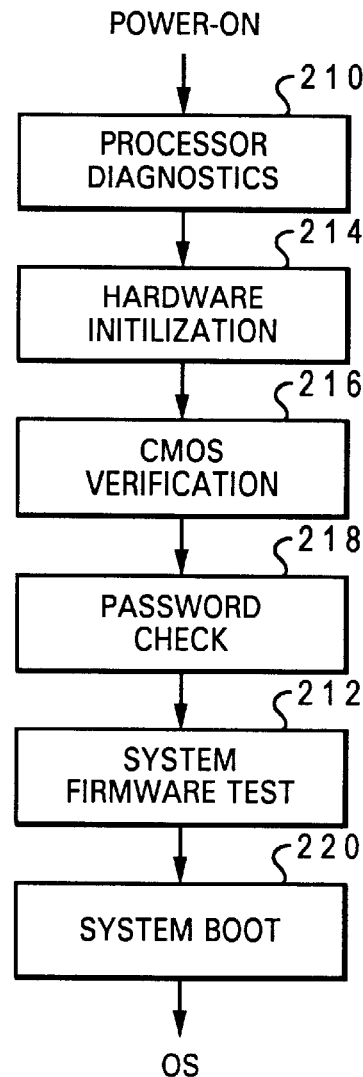
FIG. 2 is a flow chart depicting a typical symmetrical multi-processing system boot process which has been modified to include authenticating the CMOS in accordance with the teachings of this invention.

Referring now to FIG. 2, there is shown a flow chart depicting a typical symmetrical multi-processing system boot process which has been modified to include authenticating the CMOS in accordance with this invention. As shown in step 210, upon power up, processor diagnostics are performed by the service processor 195. Following this, the hardware initialization step 214 is performed. All of these steps are well known in the prior art and can be performed in any desired fashion. Next, in accordance with a preferred embodiment of the invention, the service processor 195 performs an integrity check 216 on the contents of CMOS memory to verify its authenticity, as will be more fully described below. If the CMOS passes its integrity check, the password status may be deemed "good" and therefore proceed down normal paths, prompting a password check 218 and system firmware 190 test, shown in step 212 wherein the system may be booted 220 in the normal manner.

Figure 3:
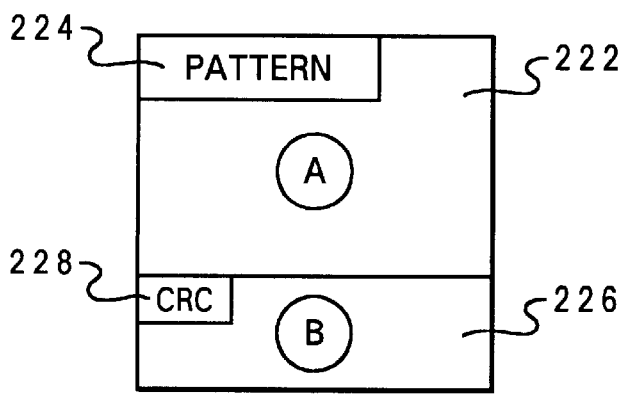
FIG. 3 is a diagram depicting a CMOS configuration in accordance with the present invention.

Turning now to FIG. 3, there is shown a diagram depicting one type of CMOS configuration for use in a more detailed explanation of the operation of the preferred embodiment used for CMOS authentication, as will be more fully explained below. As shown in FIG. 3, the CMOS memory is partitioned into two sections, an "A" section 222 defining an area to hold passwords and a fixed non-null pattern 224, and a "B" section 226 containing a Cyclic Redundancy Check (CRC) 228 signature. The fixed non-null pattern 224 is created and stored when the "A" section 222 is initially defined. The CRC signature is then computed on the complete contents of section "A" 222 including the fixed non-null pattern 224 in accordance with IEEE-standards (well known in the computer arts) simultaneously when the fixed non-null pattern 224 is created and, then the CRC 228 is stored in section "B" 226.

Figure 4:
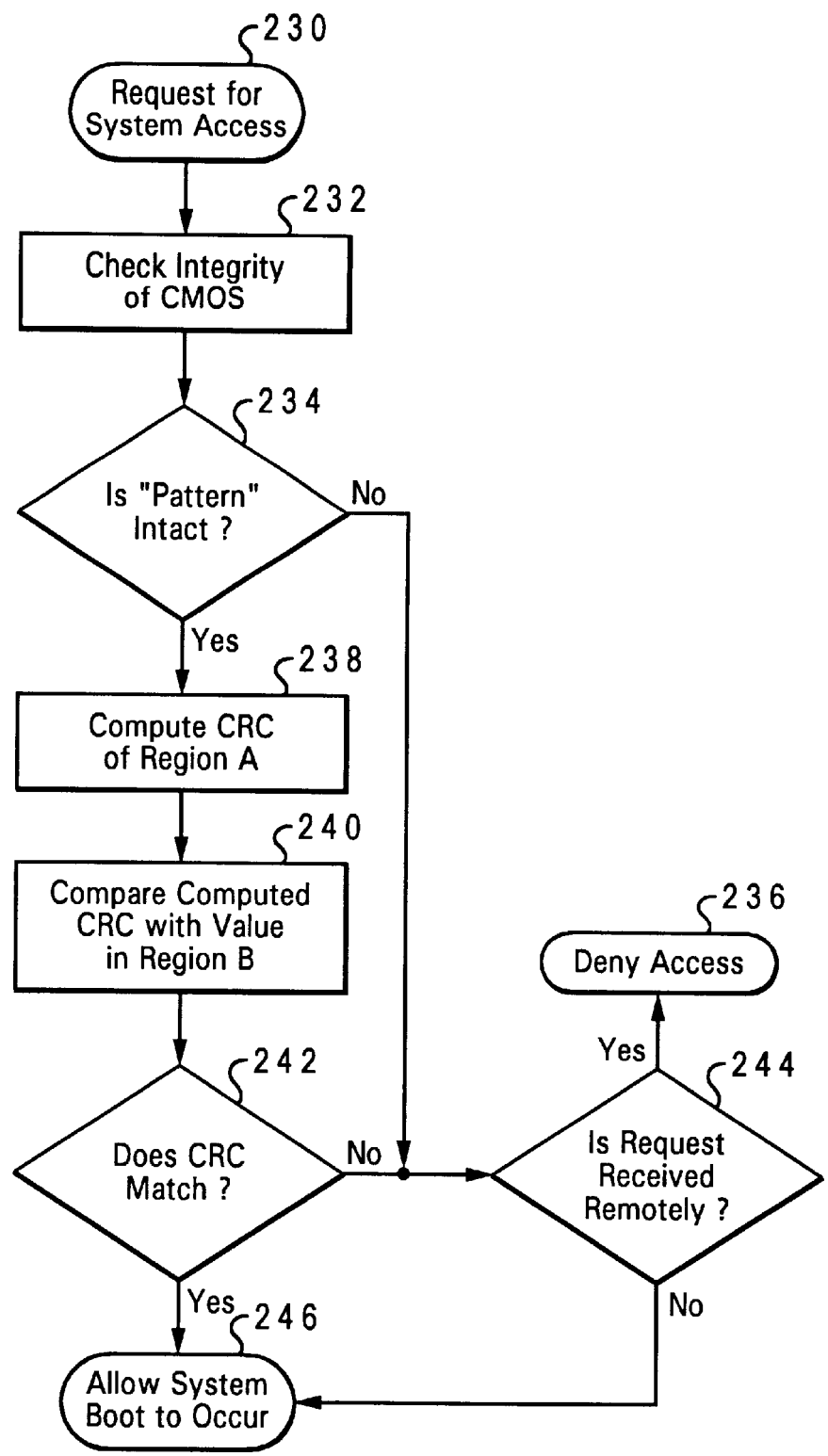
FIG. 4 is a high-level logic flow diagram of a method for checking security when a request for system access is received by a computer system within a network environment, in accordance with a preferred embodiment of the present invention.

With reference now to FIG. 4, there is illustrated a high-level logic flow diagram of a method for checking security using the above described CMOS configuration when a request for system access is received by a computer system within a network environment. Starting at block 230, when a request for system access, or call to the firmware menus, is issued, the service processor 195 performs an integrity check or CRC (Cyclic Redundancy Check), shown in step 232, on the contents of the CMOS 170 to verify its authenticity. By way of example, but not of limitation, an IEEE-standard CRC algorithm is used to confirm that the data has suffered no corruption, as would be expected from a loss of power. However, as shown in step 234, the service processor 195 begins by checking the fixed non-null pattern 224 to see if it is the same. It should be noted, that when the contents of CMOS are empty, the service processor 195 contains code that writes a fixed non-null pattern 224 into a designated location in the "A" section 222 of the CMOS 170. The service processor 195 contains code that does a bit by bit comparison between the fixed non-null pattern in its code and the fixed non-null pattern 224 in the CMOS 170. Any change detected in the fixed non-null pattern 224 prompts the service processor 195 to determine where the request was received, as will be more fully described below.

If the fixed non-null pattern 224 is intact (no change has been detected), then the methodology of the present invention proceeds to step 238 to begin performing the CRC test. As shown in step 238, a CRC signature is computed on the complete contents of section "A" 222 including the fixed non-null pattern 224 of the CMOS 170 and is compared to the previously computed CRC signature 228 stored in section "B" 226 of the CMOS 170, as shown in step 240. A determination is then made as to whether or not there is a difference between the newly computed CRC signature and the previously computed CRC signature, as shown in block 242. If the CRC signatures are the same, then no corruption exists in the CMOS 170, and the Service Processor 195 allows the system boot to occur, as shown in step 246, by prompting the user for a system password, and performs the normal authentication checks between an entered password and a stored password. If they match, then the user may perform the desired function. If the passwords do not match, then the function (system boot or firmware menus) is denied.

If the fixed non-null pattern at step 234 or CRC algorithm at step 242 confirms that corruption exists in the CMOS 170, then the service processor 195 determines where the request was received, as shown in step 244. In response to a determination that the power-on request was issued remotely, i.e., via a dial-in over the modem, while the CMOS is suspected bad, then access is denied, as shown in step 236 as a security threat. The reason access is denied is that no means exists to determine whether he or she is an authentic user. If the service processor 195 determines that the request was received locally, i.e., via a local terminal, while the CMOS is suspected bad, it is assumed that the requester being local has physical access to the system, so system boot may occur and/or firmware tools may be accessed as shown in step 246.

As has been described, the present invention provides a method and system for checking system access requests when made remotely which are of a higher risk than those made locally, and accordingly, if the CMOS is in an unknown state, then these users should be denied access. Note that, with local access, a user can re-enter a system password and restore the CMOS to a valid state once again. The present invention does not require any modifications to the existing standard communications protocols, and does not require a modification to the hardware design of the communications adapter in order to transfer any incoming data from a remote user.

It is also important to note that although the present invention has been described in the context of a fully functional security system, those skilled in the art will appreciate that the mechanisms of the present invention are capable of being distributed as a program product in a variety of forms to any type of information handling system, and that the present invention applies equally regardless of the particular type of signal bearing media utilized to actually carry out the distribution. Examples of signal bearing media include, without limitation, recordable type media such as floppy disks or CD ROMs and transmission type media such as analog or digital communications links.

While the invention has been particularly shown and described with reference to a preferred embodiment, it will be understood by those skilled in the art that various changes in form and detail may be made therein without departing from the spirit and scope of the invention.

What is claimed is:

1. A method for enhancing security upon receiving a request for access to a data processing system, said method comprising the steps of:
   authenticating contents of a non-volatile memory, wherein said contents include password data for a power-on password function;
   responsive to a failure to authenticate said non-volatile memory, determining from where said request was received;
   denying said request for access to a remotely received request in response to said determination; and
   granting said request in response to a determination that said request was received locally.

2. The method for enhancing security upon receiving a request for access to a data processing system according to claim 1, wherein said method further includes a step of creating and storing a fixed non-null pattern in said non-volatile memory.

3. The method for enhancing security upon receiving a request for access to a data processing system according to claim 2, wherein said method of authenticating contents of said non-volatile memory further includes a step of determining if said fixed non-null pattern has changed.

4. The method for enhancing security upon receiving a request for access to a data processing system according to claim 3, wherein said method of authenticating contents of said non-volatile memory further includes a step of determining if said request was received remotely in response to a determination that said fixed non-null pattern has changed.

5. The method for enhancing security upon receiving a request for access to a data processing system according to claim 1, wherein said method further includes a step of creating and storing a first CRC signature in said non-volatile memory based on a fixed non-null pattern stored in said memory.

6. The method for enhancing security upon receiving a request for access after creating and storing said first CRC signature to a data processing system according to claim 5, wherein said method of authenticating contents of said non-volatile memory further includes a step of calculating a second CRC signature if it has been determined that said fixed non-null pattern has not changed.

7. The method for enhancing security upon receiving a request for access to a data processing system according to claim 6, wherein said method of authenticating contents of said non-volatile memory further includes a step of determining if said first CRC signature is different than said second CRC signature.

8. The method for enhancing security upon receiving a request for access to a data processing system according to claim 7, wherein said method of authenticating contents of said non-volatile memory further includes a step of determining if said request was received remotely in response to a determination that said first CRC signature is different than said second CRC signature.

9. The method for enhancing security upon receiving a request for access to a data processing system according to claim 8, wherein said method of determining from where said request was received further includes a step of denying said request in response to a determination that said request was received remotely.

10. The method for enhancing security upon receiving a request for access to a data processing system according to claim 8, wherein said method of determining from where said request was received further includes a step of granting said request in response to a determination that said request was received locally.

11. An information handling system, comprising:
    means for verifying a failure of authenticating contents of a non-volatile memory, wherein said contents include password data for a power-on password function;
    means for determining a requesting location from where a request for access to said information handling system is received; and
    means for granting or denying said request for access to said information handling system based on said request location, wherein a remotely received request for access is denied and a locally received request for access is granted.

12. An information handling system according to claim 11, wherein said means for verifying a failure of authenticating further comprises a fixed pattern in said non-volatile memory.

13. An information handling system according to claim 12, wherein said means for verifying a failure of authenticating further comprises means for checking if said fixed pattern has changed.

14. An information handling system according to claim 13, wherein means for determining a requesting location further comprises means for determining if the requesting location is a remote location.

15. An information handling system according to claim 11, wherein means for verifying a failure of authenticating further comprises a first CRC signature in said non-volatile memory.

16. An information handling system according to claim 15, wherein means for verifying a failure of authenticating further comprises means for calculating a second CRC signature.

17. An information handling system according to claim 16, wherein means for verifying a failure of authenticating further comprises means for comparing said first CRC signature for determining if said second CRC signature is different.

18. An information handling system according to claim 17, wherein means for determining a requesting location further comprises means for determining if the requesting location is a remote location.

19. A data processing system for enhancing security upon receiving a request for access, comprising:
   a CMOS memory including password data for a power-on password function, a fixed non-null pattern and a first CRC signature;
   a service processor for checking a change of said fixed non-null pattern wherein if said fixed non-null pattern has changed, said service processor denying access to remotely received requests and granting access to locally received requests; and
   a CRC algorithm for calculating a second CRC signature for checking for a change against said first CRC signature wherein if said first CRC signature has changed, said service processor denying access to remotely received requests and granting access to locally received requests.

20. A computer program product residing on a computer usable medium for providing security to an information handling system, wherein said computer program product when executed performs the steps of:
   authenticating contents of a non-volatile memory, wherein said contents include password data for a power-on password function;
   responsive to failure to authenticate said memory, determining from where a request for access was received;
   denying said request for access to a remotely received request in response to said determination; and
   granting said request in response to a determination that said request was received locally.

21. A computer program product according to claim 20, wherein authenticating contents of said memory includes determining if a fixed non-null pattern has changed within said non-volatile memory.

22. A computer program product according to claim 20, wherein authenticating contents of said non-volatile memory includes determining if a CRC signature has changed within said memory.

23. A computer program product according to claim 22, wherein if said CRC signature has changed, granting said request if received locally.

* * * * *